United States Patent Office 3,255,195
Patented June 7, 1966

3,255,195
ORGANOMETALLIC COMPOUNDS AND
PROCESSES
Richard E. Benson, Wilmington, Del., assignor to E. I. du
Pont de Nemours and Company, Wilmington, Del., a
corporation of Delaware
No Drawing. Filed May 21, 1963, Ser. No. 282,173
12 Claims. (Cl. 260—270)

This invention relates to, and has as its principal objects provision of, salts of anions derived from chelates of dimercaptomaleonitrile, and methods of synthesis therefor. Specifically, the invention concerns salts of monovalent anions derived from chelates of dimercaptomaleonitrile and their preparation.

Various chelates derived from dimercaptomaleonitriles are known in the art; e.g., Bähr, Ang. Chem. 70, 606–7; Bähr and Schleitzer, Chem. Ber., 90, 438–43; and Gray et al., J. Am. Chem. Soc. 84, 3596–7; however, monovalent anions derived from chelated dimercaptomaleonitriles have not been described. This invention is concerned with a new class of such compounds, namely, salts containing anions of monovalent bis(1,2-dicyanoethylene-1,2-dithiolato)metal chelates. Such salts are prepared by oxidation of the corresponding divalent anion.

Specifically, the anionic chelate compounds are embraced by the formula (1) 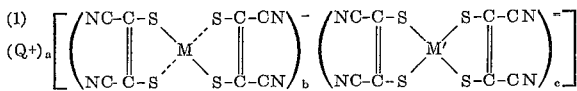

where Q is defined as one equivalent of a cation, i.e., one equivalent of a metal, ammonium, sulfonium, arsonium, phosphonium, stibonium, selenonium, or teluronium cation in which any substituents, other than hydrogen, on the -onium cations are alkyl or aryl of up to 20 carbon atoms. Metals are defined as those elements of atomic number 3, 4, 11–13, 19–32, 37–51, 55–84, 87–102 and above. Preferably the -onium cations may be represented, respectively, as $R_4N^+$, $R'_3S^+$, $R'_4As^+$, $R'_4P^+$, $R'_4Sb^+$, $R'_3Se^+$ and $R'_3Te^+$, where R is hydrogen,- alkyl or aryl and can be covalently joined together to form a heterocyclic aromatic ring with the nitrogen (e.g., pyridinium, quinolinium, etc.); and R' is alkyl or aryl. Thus, when three R's of $R_4N^+$ are joined together the structure is

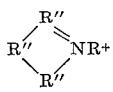

where each R" in the hetero ring is lower alkylene, preferably of up to a total of 6 carbon atoms. The R and R', described above, can contain up to 20 carbon atoms. Preferably R is hydrogen, lower alkyl or phenyl, and R' is lower alkyl or phenyl.

M and M' are defined as metals from groups IB, IVB, VB, VIB, VIIB and VIII of the Periodic Table appearing in Deming's "General Chemistry," J. Wiley & Sons, 5th ed., chapter 11; i.e., a metal of atomic number 22–29, 40–47, 72–79, inclusive. Preferably M and M' are nickel, copper, cobalt, iron, palladium or platinum and most preferably nickel.

"$a$" represents the number of Q cationic equivalents present and is defined by the formula $a=b+2c$. "$b$" is a cardinal number of from 1 to 6 inclusive, and "$c$" is a cardinal number of from 0 to 6, inclusive. Preferably $b$ is 1 or 2 and $c$ is 0 to 2, inclusive.

It is evident that when $c=0$, the products of the invention represented by Formula 1 above become:

(2) 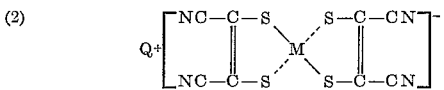

where Q and M are defined as above.

Similarly, when $c$ is one and $b$ is one, Formula 1 becomes:

(3) $(Q^+)_3$ [formula as shown]

where Q, M and M' are defined as above.

Included within the scope of the invention are those salts which contain more than one cation, i.e., defect-type structures quite parallel to the well-known oxygen-deficient metal oxides, as well as metal-deficient metal oxides. Thus, these salts include species which can be deficient in either or both the cation or anion portion. Furthermore, in the case of those compounds of the complex anion structure wherein there are present in the ground state of the compound combined monovalent and divalent anionic bis(1,2-dicyanoethylene-1,2-dithiolato)-metal chelate moieties, these combined moieties do not necessarily have to be integral, and they can be present in both an integrally and/or non-integrally equivalent number.

The process by which the monovalent bis(1,2-dicyanoethylene-1,2-dithiolato)metal chelate anionic salts are prepared comprises reacting a divalent bis(1,2-dicyanoethylene-1,2-dithiolato)metal chelate anionic salt with an oxidizing agent. This reaction may be illustrated by the equation:

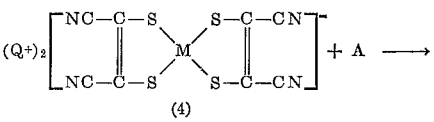

(4)

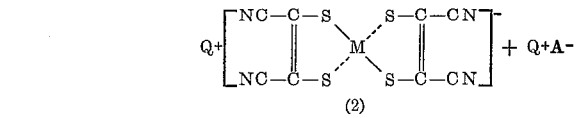

(2)

where A is one chemical equivalent of an oxidizing agent and Q and M are as previously defined.

The oxidation set forth by the above equation, to be operative, must occur over the range −0.5 to +0.5 volt, referred to an aqueous saturated calomel electrode (SCE), as measured in an acetonitrile solvent system containing 0.1 M lithium perchlorate as an electrolyte (and not as the oxidizing agent), with a rotating platinum electrode.

In the process of the invention, any molar ratio of A to the compound of Formula 4 may be used; however, preferably the ratio should not exceed 1, nor fall below 0.1.

The temperature may range between −80° to 250° C. and preferably is between 0° and 200° C.

In the preferred practice, the pressure maintained is atmospheric; however, it is not critical and the reaction may be conducted at pressures either above or below atmospheric.

Nor is the presence of a liquid reaction medium essential, for a powdered salt of Formula 4 may be reacted with oxygen to produce a salt of Formula 2. The use of a liquid medium chemically inert to the reactants and products is preferred however. Most preferred is a solvent medium from which the products of Formula 2 are easily precipitated. Suitable media include acetonitrile, methanol, water/methanol, ethanol, water/ethanol, dioxane, tetrahydrofuran and the like.

As previously stated, the oxidation system used must have a half-wave potential between −0.5 and +0.5 v. (referred to the aqueous saturated calomel electrode using acetonitrile solvent containing 0.1 M lithium perchlorate as the electrolyte and with a rotating platinum electrode). Care must be taken to ensure the observed potential of the oxidation-reduction system is kept within the above limits by selecting reactants which do not markedly alter the activity of the oxidizing agent and the reduced species. Since the observed potential of an oxidation-reduction system is dependent upon the activity of the oxidizing agent and of the reduced species, as evidenced by the formula $$E_{obs.} - E° = \frac{0.0591}{n} \log \frac{\text{(activity of reduced species)}}{\text{(activity of oxidized species)}}$$

where E° is the standard potential value and $n$ is the number of electrons changing, it is important to select reactants which will not markedly alter the activities of the oxidizing agent and the reduced species by, for example, formation of an insoluble product or formation of a complex. As an example, when disilver bis(1,2-dicyanoethylene-1,2-dithiolato)palladium is oxidized by iodine, the precipitation of silver iodide so reduces the concentration of the reduced species in the system that the observed potential increases to a point well above the upper limit of +0.5 v. and no monovalent bis(1,2-dicyanoethylene-1,2-dithiolato)palladium chelate is isolated. On the other hand, as shown in several examples below, iodine in systems which do not precipitate the reduced iodide species provides oxidation-reduction potentials within the required limits.

Examples of oxidizing agents (A) include chlorine, bromine, iodine, chloranil, bromanil, tetracyanoethylene, 7,7,8,8-tetracyanoquinodimethan, oxygen, cupric nitrate, ferric nitrate, potassium permanganate, dichlorodicyanobenzoquinone and the like.

The compositions defined by Formula 3 may be prepared by treating a compound of Formula 2 with the compound of Formula 4. The reactants are heated in a common solvent, though a solvent is not necessary and the product of Formula 3 isolated upon cooling.

The compounds of the invention are characterized by their crystalline form, including both microcrystals and single crystals. This latter term is used in its art-recognized sense as meaning an integral body of solid matter containing an ordered periodic arrangement of atoms which extends unchanged throughout the body without discontinuity or change of orientation. They are further characterized by their generically deep colors and their anisotropic low electrical volume resistivity.

The invention is illustrated in greater detail by the following examples in which "parts" are by weight unless otherwise specified.

EXAMPLE I

Part A

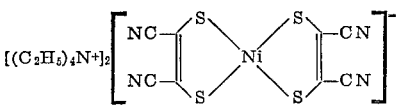

In 2500 parts of water is dissolved 186 parts of disodium 1,2-dicyanoethylene-1,2-dithiolate [Bähr and Schleitzer, Chem. Ber. 90, 438–43 (1957)], and 210 parts of tetraethylammonium bromide. The solution is stirred and a solution of 120 parts of nickelous chloride hexahydrate in 1000 parts of water is added in small portions. The light orange solid which separates a collected on a filter and then taken up in 11,840 parts of boiling ethanol. The solution is filtered and then cooled to 0° C. to obtain 230 parts (78% yield) of bis(tetraethylammonium) bis-(1,2-dicyanoethylene-1,2-dithiolato)nickel in the form of orange-red platelets, M.P. ca. 243–246° C. (dec.). The electrical volume resistivity (compaction) is $7.8 \times 10^{13}$ ohm cm.

Analysis.—Calcd. for $C_{24}H_{40}N_6S_4Ni$: C, 48.1; H, 6.7; N, 14.0; Ni, 9.8. Found: C, 48.1; H, 6.6; N, 14.2; Ni, 9.8.

Part B

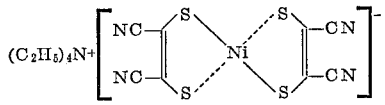

In a glass reactor is placed a solution of 11.02 parts of bis(tetraethylammonium) bis(1,2-dicyanoethylene-1,2-dithiolato)nickel in 39,140 parts of deoxygenated acetonitrile containing 532 parts of lithium perchlorate. The system is blanketed with nitrogen and held at room temperature. By means of a polarograph an e.m.f. is applied to this solution between a rotating platinum electrode and a saturated calomel electrode. At voltages in the range from +0.1 to +0.25 volt there is a substantial current flow with the formation of the monovalent bis(1,2-dicyanoethylene - 1,2 - dithiolato)nickel anion, i.e., mono (tetraethylammonium) bis(1,2 - dicyanoethylene - 1,2-dithiolato)nickel, at the rotating platinum electrode.

Part C

The procedure of Part B is repeated using a solution of 2.20 parts of bis(tetraethylammonium) bis(1,2-dicyanoethylene-1,2-dithiolato)nickel in 19,570 parts of deoxygenated acetonitrile containing 266 parts of lithium perchlorate. At voltages in the range from +0.1 to +0.25 volt there is a substantial current flow with the formation of the monovalent bis(1,2-dicyanoethylene-1,2-dithiolato) nickel anion, i.e., mono(tetraethylammonium) bis(1,2-dicyanoethylene - 1,2 - dithiolato)nickel, at the rotating platinum electrode.

Part D

The procedure of Part B is repeated using a solution of 2.71 parts of bis(tetraethylammonium) bis(1,2-dicyanoethylene-1,2-dithiolato)nickel in 39,140 parts of deoxygenated acetonitrile containing 532 parts of lithium perchlorate. At voltages in the range from +0.1 to +0.25 volt there is a substantial current flow with the formation of the monovalent bis(1,2-dicyanoethylene-1,2-dithiolato)nickel anion, i.e., mono(tetraethylammonium) bis(1,2-dicyanoethylene-1,2-dithiolato)nickel, at the rotating platinum electrode.

EXAMPLE II

A small amount of bis(tetraethylammonium) bis(1,2-dicyanoethylene-1,2-dithiolato)nickel is treated with 7,7,8,8-tetracyanoquinodimethan in acetonitrile solution at room temperature. A green solution characteristic of 7,7,8,8 - tetracyanoquinodimethanide is obtained. The EPR spectrum of this solution shows the characteristic spectrum of 7,7,8,8-tetracyanoquinodimethanide as well as a new line of low intensity at $g=2.032$ which is characteristic of the monotetraethylammonium bis(1,2-dicyanoethylene-1,2-dithiolato)nickel which is formed.

EXAMPLE III

To a solution of 240 parts of bis(tetraethylammonium) bis(1,2 - dicyanoethylene - 1,2 - dithiolato)nickel in 3914 parts of warm acetonitrile is added 60 parts of tetracyanoethylene. The dark solution is warmed for 10 minutes and then allowed to stand at room temperature for one hour. The resulting mixture is cooled to 0° C. and the product recovered by filtration. The resulting shiny black crystals of mono(tetraethylammonium) bis(1,2-dicyanoethylene - 1,2 - dithiolato)nickel weigh 102 parts. The product is recrystallized from acetone and identified by its infrared, visible and ultraviolet absorption spectra.

*Analysis.*—Calcd. for $C_{16}H_{20}N_5S_4Ni$: C, 40,95; H, 4.30; S, 27.33; N, 14.92; Ni, 12.51. Found: C, 41.77, 41.67; H, 4.22, 4.47; S, 27.47; N, 14.69; Ni, 12.39.

EXAMPLE IV

To a solution of about 18 parts of bis(tetraethylammonium) bis(1,2-dicyanoethylene-1,2-dithiolate)nickel in 1580 parts of hot ethanol 500 parts of water is added. A solution of bromine in water-ethanol is added and a blue precipitate forms. The aqueous bromine solution is added until a red color attributed to excess bromine is present in the reaction solution. The blue solid is removed by filtration to give 13 parts of mono(tetraethylammonium) bis(1,2 - dicyanoethylene - 1,2 - dithiolato) nickel. The compound is recrystallized from acetone to give shiny black needles, M.P. (dec.) —295° C. The infrared spectrum, determined as a mineral oil mull, shows major absorption at $4.54\mu$ (CN). The ultraviolet and visible spectrum, determined in acetonitrile, shows absorption at 478 m$\mu$ and strong absorption at 850 m$\mu$. The electrical volume resistivity determined along the long axis of a single crystal of this compound is about $10^5$ ohm cm.

EXAMPLE V

In 1566 parts of boiling acetonitrile is dissolved 300 parts of bis(tetraethylammonium) bis(1,2-dicyanoethylene-1,2-dithiolato)nickel and a solution of 64 parts of iodine in 235 parts of boiling acetonitrile is added. The solution is filtered, cooled to 0° C., and the black needles which form are collected on a filter and washed with dichloromethane. The yield of mono(tetraethylammonium) bis(1,2-dicyanoethylene-1,2-dithiolato)nickel is 85 parts. It is identified by its infrared spectrum and thermal decomposition point. The product can be recrystallized from acetonitrile.

*Analysis.*—Calcd. for $C_{16}H_{20}N_5S_4Ni$: C, 40.95; H, 4.30. Found: C, 40.84; H, 4.39.

This example represents a preferred embodiment.

EXAMPLE VI

Part A

In 2500 parts of water is dissolved 186 parts of disodium 1,2-dicyanoethylene-1,2-dithiolate and 210 parts of tetraethylammonium bromide. The solution is stirred and a solution of 85 parts of cupric chloride dihydrate in 1000 parts of water is added in small portions. The brown solid which separates is collected on a filter and recrystallized from methanol to obtain 140 parts of bis(tetraethylammonium) bis(1,2 - dicyanoethylene - 1,2-dithiolato)copper in the form of brownish-red needles, M.P. 137–140° C. (dec.). The electrical volume resistivity (compaction) is $6.9 \times 10^{12}$ ohm cm.

*Analysis.*—Calcd. for $C_{24}H_{40}N_6S_4Cu$: C, 47.7; H,6.7; N, 13.9; Cu, 10.5. Found: C, 47.9; H, 6.7; N, 13.6; Cu, 10.6.

Part B

In 9866 parts of boiling ethanol is dissolved 300 parts of bis(tetraethylammonium) bis(1,2-dicyanoethylene-1,2-dithiolato)copper. The solution is filtered, and a boiling solution of 64 parts of iodine in 1184 parts of ethanol is added. The mixture is allowed to stand overnight and the solid product is collected on a filter and washed with dichloromethane. The yield of mono(tetraethylammonium) bis(1,2-dicyanoethylene-1,2-dithiolato)copper in the form of black needles is 160 parts, M.P. ca. 230–235° C. (dec.). The volume electrical resistivity (long axis of single crystal) of this product is $10^6$ ohm cm. On a compaction of powdered crystals the resistivity is $1.2 \times 10^{10}$ ohm cm., confirming the electrical anisotropy of the crystal.

*Analysis.*—Calcd. for $C_{16}H_{20}N_5S_4Cu$: C, 40.5; H, 4.3; N, 14.8; S,27.1; Cu, 13.4. Found: C, 40.5; H, 4.2; N, 14.6; S, 27.1; Cu, 13.4.

EXAMPLE VII

Part A

In 1000 parts of deoxygenated water under nitrogen atmosphere is dissolved 75 parts of disodium 1,2-dicyanoethylene-1,2-dithiolate and a solution of 48 parts of cobaltous chloride hexahydrate in 400 parts of deoxygenated water is added. To this brown solution is added gradually a solution of 84 parts of tetraethylammonium bromide in 400 parts of deoxygenated water. The brown solid is collected on a filter under nitrogen and dried in a vacuum at 50° C. over phosphorus pentoxide, yield 95 parts. Into 793 parts of boiling methanol is placed 20 parts of the dried, crude solid. The solution is boiled for about two minutes and filtered quickly. The insoluble portion is set aside for Part B. The filtrate is cooled rapidly to 0° C. and the dark brown platelets of bis(tetraethylammonium) bis(1,2-dicyanoethylene-1,2-dithiolato)cobalt are collected on a filter under a nitrogen atmosphere. This product is dried in a vacuum at 50° C. over phosphorus pentoxide. The product melts at 232–235° C. with decomposition.

*Analysis.*—Calcd. for $C_{24}H_{40}N_6S_4Co$: C, 48.1; H, 6.8; N, 14.0; S, 21.4; Co, 9.8. Found: C, 47.9; H, 6.8; N, 13.8; S, 20.9; Co, 9.7.

Part B

The insoluble portion from the methanol recrystallization step described in Part A above is dissolved in 6342 parts of boiling methanol, and the mixture is boiled in air for about one hour and filtered hot. The filtrate is allowed to stand overnight to obtain black needles of mono(tetraethylammonium) bis(1,2-dicyanoethylene-1,2-dithiolato)cobalt which are collected and dried as above; yield 4.5 parts; decomposition point about 300° C. The volume resistivity (single crystal) is $6 \times 10^5$ ohm cm. On a compaction the electrical resistivity is $4.6 \times 10^9$ ohm cm.

*Analysis.*—Calcd. for $C_{16}H_{20}N_5S_4Co$: C, 40.9; H, 4.3; N, 14.9; Co, 12.5. Found: C, 41.1; H, 4.4; N, 14.7; Co, 12.5.

EXAMPLE VIII

A solution of 24 parts of cobaltous chloride hexahydrate in 200 parts of water is added gradually, with stirring under a nitrogen atmosphere, to a solution of 37 parts of disodium 1,2-dicyanoethylene-1,2-dithiolate and 42 parts of tetraethylammonium bromide in 500 parts of water. The crude product is collected on a suction filter in air and washed with water on the filter. The water-wet filter cake is taken up in 793 parts of boiling methanol, the solution filtered and the filtrate cooled to obtain 17 parts of brown platelets. This solid is suspended in 15,786 parts of ethanol; the ethanol is heated to boiling and filtered. The filtrate is allowed to stand at room temperature overnight to obtain 9 parts of mono(tetraethylammonium) bis(1,2-dicyanoethylene-1,2-dithiolato)cobalt in the form of black needles, M.P. >300° C. The electrical resistivity (compaction) is $9 \times 10^7$ ohm cm. Analysis indicates that this product also contains bis(tetraethylammonium) bis(1,2-dicyanoethylene-1,2-dithiolato)cobalt.

*Analysis.*—Calcd. for $C_{16}H_{20}N_5S_4Co$: C, 40.9; H, 4.3; N, 14.9; Co, 12.5. Found: C, 41.9; H, 4.6; N, 14.9; Co, 12.0.

EXAMPLE IX

To a solution of 186 parts of disodium 1,2-dicyanoethylene-1,2-dithiolate in 2763 parts of boiling ethanol is added a warm solution of 135 parts of ferric chloride hexahydrate in 1579 parts of ethanol. The solution is heated to boiling, filtered, and to the filtrate is added a boiling solution of 210 parts of tetraethylammonium bromide in 1184 parts of ethanol. The black solution is allowed to stand at room temperature for 15 minutes and is then cooled to 0° C. The solid product which separates is collected on a filter and washed with a little ice cold ethanol. The yield of mono(tetraethylammonium) bis(1,2-dicyanoethylene-1,2-dithiolato)iron in the form of black needles is 125 parts; M.P. ca. 280° C. (dec.). The electrical volume resistivity (compaction) is $3.9 \times 10^{11}$ ohm cm.

*Analysis.*—Calcd. for $C_{16}H_{20}N_5S_4Fe$: C, 41.2; H, 4.3; N, 15.0; S, 27.5. Found: C, 41.5; H, 4.5; N, 15.4; S, 27.4.

EXAMPLE X

Part A

In 5000 parts of deoxygenated water is suspended 89 parts of palladium dichloride and 186 parts of disodium 1,2-dicyanoethylene-1,2-dithiolate is added. The mixture is stirred under a nitrogen atmosphere at room temperature for two days. The solution is filtered, diluted with 2500 parts of water, heated to boiling and treated with a solution of 210 parts of tetraethylammonium bromide in 2500 parts of water. The green solid which separates is collected on a filter, taken up in 7893 parts of boiling ethanol, the solution filtered hot and the filtrate cooled in a wet-ice acetone bath to obtain 115 parts (35% yield) of bis(tetraethylammonium) bis(1,2-dicyanoethylene-1,2-dithiolato)palladium in the form of green platelets, M.P. ca. 240° C. (dec.).

*Analysis.*—Calcd. for $C_{24}H_{40}N_6S_4Pd$: C, 44.5; H, 6.2; N, 13.0; Pd, 16.5. Found: C, 44.8; H, 6.2; N, 12.9; Pd, 16.5.

Part B

In 783 parts of warm acetonitrile is dissolved 65 parts of the palladium chelate described in Part A above and a solution of 13 parts of tetracyanoethylene in 391 parts of acetonitrile is added. The solution is cooled to 0° C. and filtered to remove a first crop of solid. The filtrate is diluted with 10,020 parts of dichloromethane, the solution heated just to boiling and allowed to stand at room temperature for two days. Filtration affords 20 parts of mono(tetraethylammonium) bis(1,2-dicyanoethylene-1,2-dithiolato)palladium in the form of shiny black needles.

*Analysis.*—Calcd. for $C_{16}H_{20}N_5S_4Pd$: C, 37.2; H, 3.9. Found: C, 37.1; H, 4.1.

EXAMPLE XI

Part A

A mixture of 50 parts of dipotassium platinous chloride ($K_2PtCl_4$) and 45 parts of disodium 1,2-dicyanoethylene-1,2-dithiolate in 500 parts of deoxygenated water is heated to boiling and a solution of 51 parts of tetraethylammonium bromide in 250 parts of water is added. The mixture is filtered while hot and the red filter cake is washed with water and air-dried. The crude solid is recrystallized from ethanol to obtain 47 parts of bis(tetraethylammonium) bis(1,2-dicyanoethylene-1,2-dithiolato)platinum in the form of red flakes, M.P. 242–245° C. (dec.).

*Analysis.*—Calcd. for $C_{24}H_{40}N_6S_4Pt$: C, 39.4; H, 5.4; N, 11.4; Pt, 26.5. Found: C, 39.1; H, 5.5; N, 11.3; Pt, 27.3.

Part B

In 7893 parts of boiling ethanol is dissolved 74 parts of bis(tetraethylammonium) bis(1,2-dicyanoethylene-1,2-dithiolato)platinum and to this solution is added a boiling solution of 13 parts of iodine in 1184 parts of boiling ethanol. The solution is allowed to cool to room temperature and the black needles which separate are collected on a filter and washed with cold alcohol and dichloromethane to obtain 40 parts of mono(tetraethylammonium) bis(1,2-dicyanoethylene-1,2-dithiolato)platinum, M.P. 285–288° C. (dec.).

*Analysis.*—Calcd. for $C_{16}H_{20}N_5S_4Pt$: C, 31.7; H, 3.3; N, 11.6. Found: C, 31.8; H, 3.3; N, 11.2.

EXAMPLE XII

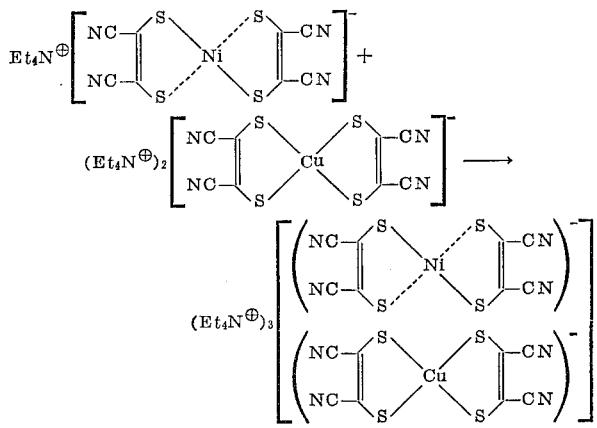

Approximately equal amounts of mono(tetraethylammonium) bis(1,2 - dicyaoethylene - 1,2 - dithiolato) nickel and bis(tetraethylamomonium) bis(1,2-dicyanoethylene-1,2-dithiolato)copper are dissolved in boiling acetone. The solution is filtered and allowed to cool. The black needles that separate are removed by filtration, washed with a cold acetone-water solution (60–40) and with cold methanol. The product is dried in air. Examination of the crop of crystals shows that some long, fine needles are present together with large crystals. The fine needles resemble in appearance the crystal form of the starting mono(tetraethylammonium) bis(1,2-dicyanoethylene-1,2-dithiolato)nickel. The large crystals do not resemble in crystalline form either of the two starting materials, and under a microscope, they are ascertained to be single crystals. X-ray examination of the large crystals indicates that they do not contain bis(tetraethylammonium) bis(1,2 - dicyanoethylene-1,2 - dithiolato) copper nor bis(tetraethylammonium) bis(1,2-dicyanoethylene-1,2-dithiolato)nickel, but rather are double anionic salts of tris(tetraethylammonium) [monovalent bis(1,2 - dicyanoethylene - 1,2 - dithiolato)nickel·divalent bis(1,2 - dicyanoethylene - 1,2 - dithiolato)copper]. Volume resistivity studies (single crystal) of two of the large crystals give values of $10^{-6}$ ohm cm. and $10^{-7}$ ohm cm.

EXAMPLE XIII

Part A

In 300 parts of water is dissolved 120 parts of $NiCl_2 \cdot 6H_2O$ and 186 parts of disodium 1,2-dicyanoethylene-1,2-dithiolate. A solution of 270 parts of quinoline methiodide in 1000 parts of water is added and within a few minutes a grey-black solid separates. It is collected on a filter and washed with water. The crude, water-wet filter cake is dissolved in a boiling mixture of 11,840 parts of ethanol and 3914 parts of acetonitrile, the solution filtered hot, and then cooled to 0° C. to obtain 130 parts of bis(N-methylquinolinium) bis(1,2-dicyanoethylene-1,2-dithiolato)nickel in the form of shiny black crystals, M.P. —262–265° C. (dec.).

*Analysis.*—Calcd. for $C_{28}H_{20}N_6S_4Ni$: C, 53.6; H, 3.2; N, 13.4; Ni, 9.4. Found: C. 53.9; H, 3.3; N, 13.6; Ni, 9.4.

Part B

In 3914 parts of boiling acetonitrile is dissolved 63 parts of bis(N - methylquinolinium) bis(1,2 - dicyanoethylene- 1,2-dithiolato)nickel. A boiling solution of 13 parts of iodine in 1184 parts of ethanol is added and the mixture is allowed to cool to room temperature to obtain 25 parts of mono(N-methylquinolinium) bis(1,2-dicyanoethylene-1,2-dithiolato)nickel in the form of blue-black needles, M.P. 258–261° C. (dec.).

*Analysis.*—Calcd. for $C_{18}H_{10}N_5S_4Ni$: C, 44.7; H, 2.1. Found: C, 44.9; H, 2.0.

EXAMPLE XIV

Part A

In 6000 parts of water is dissolved 370 parts of disodium 1,2-dicyanoethylene-1,2-dithiolate and 240 parts of nickel chloride hexahydrate. The solution is heated to boiling and a boiling solution of 800 parts of methyltriphenylphosphonium iodide in a mixture of 5000 parts of water and 1184 parts of ethanol is added. The mixture is cooled to room temperature and the orange-red solid which separates is collected on a filter and washed with water. This product is air dried and recrystallized from a mixture of 15,790 parts of ethanol and 7828 parts of acetonitrile to obtain 630 parts of bis(methyltriphenylphosphonium) bis(1,2 - dicyanoethylene - 1,2 - dithiolato)nickel.

*Analysis.*—Calcd. for $C_{38}H_{36}P_2N_4S_4Ni$: C, 61.8; H, 4.1; S, 14.3; Ni, 6.6. Found: C, 62.2; H, 4.2; S, 14.1; Ni, 6.6.

Part B

In a boiling mixture of 1579 parts of ethanol and 1174 parts of acetonitrile is dissolved 90 parts of bis(methyltriphenylphosphonium) bis(1,2 - dicyanoethylene - 1,2-dithiolato)nickel. The solution is filtered, kept boiling and a boiling solution of 15 parts of iodine in 1184 parts of ethanol is added. The mixture is allowed to stand at room temperature for two hours and the long black needles which separate are collected and washed on the filter with ethanol to obtain 40 parts of mono(methyltriphenylphosphonium) bis(1,2-dicyanoethylene-1,2-dithiolato)nickel, M.P. 198–200° C. (dec). The electrical volume resistivity along the needle axis is $5 \times 10^6$ ohm cm. Resistivity along both orthogonal axes is $1 \times 10^9$ ohm cm.

*Analysis.*—Calcd. for $C_{27}H_{18}N_4S_4PNi$: C, 52.6; H, 2.9; S, 20.8; Ni, 9.5. Found: C, 52.9; H, 3.1; S, 20.9; Ni, 9.4.

EXAMPLE XV

A boiling solution of 186 parts of disodium 1,2-dicyanoethylene-1,2-dithiolate and 120 parts of nickel chloride hexahydrate in 5000 parts of water is treated with a boiling solution of 450 parts of methyltriphenylarsonium iodide in a mixture of 2000 parts of water and 1579 parts of ethanol. The mixture is filtered while hot and the orange-red solid is washed on the filter with water. The water-wet filter cake is dissolved in a boiling mixture of 7893 parts of ethanol and 3914 parts of acetonitrile. The hot solution is filtered, kept boiling and treated with a boiling solution of 90 parts of iodine in 3947 parts of ethanol. The solution is allowed to stand at room temperature overnight. The black needles which separate are collected and washed on the filter with alcohol to obtain 220 parts of mono(methyltriphenylarsonium) bis(1,2 - dicyanoethylene - 1,2 - dithiolato) nickel, M.P. 208–210° C. (dec.). The electrical volume resistivity along the needle axis is $4 \times 10^6$ ohm cm. Resistivity along one orthogonal axis is $6 \times 10^8$ ohm cm. and along the other orthogonal axis is $5 \times 10^8$ ohm cm.

*Analysis.*—Calcd. for $C_{27}H_{18}N_4S_4$ AsNi: C, 49.1; H, 2.7; S, 19.4; Ni, 8.9. Found: C, 49.0; H, 2.8; S, 19.6; Ni, 8.9.

EXAMPLE XVI

A solution of 372 parts of disodium 1,2-dicyanoethylene-1,2-dithiolate and 240 parts of nickel chloride hexahydrate in 5000 parts of water is slowly poured into a solution of 130 parts of iodine in 3947 parts of ethanol. The grey-green precipitate which forms is collected on a filter, washed with water, and recrystallized from 7893 parts of ethanol to obtain 150 parts of monosodium bis(1,2-dicyanoethylene-1,2-dithiolato)nickel in the form of black crystals, M.P. >350° C.

*Analysis.*—Calcd. for $C_8N_4S_4NiNa$: C, 26.7; S, 35.4; Ni, 16.2. Found: C, 26.9; S, 35.1; Ni, 16.2.

EXAMPLE XVII

A dilute aqueous solution of bis(tetraethylammonium) bis(1,2 - dicyanoethylene - 1,2-dithiolato)nickel is treated with a dilute aqueous solution of chlorine. The red color immediately is discharged and a blue-gray solid separates. The infrared spectrum of the product establishes it to be mono(tetraethylammonium) bis(1,2-dicyanoethylene-1,2-dithiolato)nickel.

EXAMPLE XVIII

In 2700 parts of boiling ethanol is dissolved 36 parts of monosodium bis(1,2 - dicyanoethylene-1,2-dithiolato)-nickel. The solution is filtered and kept hot while a solution of 40 parts of methyltriphenylphosphonium iodide in 1550 parts of boiling ethanol is added. The mixture is allowed to stand at room temperature for two hours. A precipitate of 50 parts of mono(methyltriphenylphosphonium) bis(1,2-dicyanoethylene-1,2-dithiolato)nickel is obtained. This product prepared by metathesis is identical to the one obtained in Example XIV-B. By similar metatheses of monosodium bis(1,2-dicyanoethylene-1,2-dithiolato)nickel with metal salts the corresponding magnesium, potassium, chromium, cobalt, zinc, molybdenum, cadmium, tin, barium, mercury and lead bis(1,2 - dicyanoethylene - 1,2 - dithiolato)nickel salts are obtained.

EXAMPLE XIX

In 2700 parts of boiling ethanol is dissolved 36 parts of monosodium bis(1,2 - dicyanoethylene-1,2-dithiolato)-nickel. The solution is filtered and kept hot while a solution of 31 parts of N-methylphenazinium methyl-sulfate in 1550 parts of boiling ethanol is added. After two hours at room temperature the mixture yields a precipitate of 43 parts of mono(N-methylphenazinium) bis(1,2-dicyanoethylene-1,2-dithiolato)nickel in the form of black needles.

*Analysis.*—Calcd. for $C_{21}H_{11}N_6S_4Ni$: C, 47.2; H, 2.1; S, 24.0; Ni, 11.0. Found: C, 47.2; H, 2.2; S, 23.8; Ni, 10.7.

EXAMPLE XX

In a glass reactor containing glass balls and a polytetrafluoroethylene coated magnetic stirrer is placed 10 parts of bis(tetraethylammonium) bis(1,2-dicyanoethylene-1,2-dithiolato)nickel. The reactor is evacuated of gaseous content and then connected to a supply of bromine vapor. The stirrer is rotated, agitating the glass balls and grinding the salt in the bromine vapor for one hour. During this time, the rust-red solid turns black. Residual bromine is carefully removed by evacuation. The black residue is recrystallized from 2400 parts of ethanol to obtain 5.5 parts of monotetraethylammonium bis(1,2 - dicyanoethylene - 1,2 - dithiolato)nickel, which is identified by its melting point and infrared absorption spectrum. When iodine vapor is substituted for bromine vapor in the process of this example, and the time of agitation is increased to 72 hours, a similar yield of monotetraethylammonium bis(1,2 - dicyanoethylene-1,2-dithiolato)nickel is obtained.

When the onium halides indicated in the table below are substituted for tetraethylammonium bromide in Example VII and the procedures of Parts A and B of Example VII are otherwise carried out, the end products indicated in the table are obtained. The products are all strongly colored.

In addition to the elemental analysis, the products of the invention are identifiable by absorption spectra and

TABLE

| | Onium Halide | End Product |
|---|---|---|
| XXI | Trimethylsulfonium iodide | Mono(trimethylsulfonium) bis (1,2-dicyanoethylene-1,2-dithiolato)-cobalt. |
| XXII | Diethylmethylsulfonium bromide. | Mono(diethylmethylsulfonium) bis-(1,2-dicyanoethylene-1, 2-dithiolato)-cobalt. |
| XXIII | Triphenylsulfonium chloride | Mono(triphenylsulfonium) bis(1,2-dicyanoethylene-1,2-dithiolato)-cobalt. |
| XXIV | Dodecyldiphenyl-p-tolylphosphonium bromide. | Mono(dodecyldiphenyl-p-tolylphosphonium) bis(1,2-dicyanoethylene-1,2-dithiolato)cobalt. |
| XXV | Tetraethylphosphonium iodide. | Mono(tetraethylphosphonium) bis-(1-2-dicyanoethylene-1,2-dithiolato)-cobalt. |
| XXVI | Tetraphenylphosphonium bromide. | Mono(tetraphenylphosphonium) bis-(1,2-dicyanoethylene-1,2-dithiolato)-cobalt. |
| XXVII | Tetraphenylarsonium bromide. | Mono(tetraphenylarsonium) bis(1,2-dicyanoethylene-1,2-dithiolato)-cobalt. |
| XXVIII | Methyltriphenylarsonium iodide. | Mono(methyltriphenylarsonium) bis-1,2-dicyanoethylene-1,2-dithiolato)-cobalt. |
| XXIX | Triphenylselenonium chloride. | Mono (triphenylselenonium) bis(1,2-dicyanoethylene-1,2-dithiolato)-cobalt. |
| XXX | Triphenyltelluronium iodide | Mono(triphenyltelluronium) bis-(1,2-dicyanoethylene-1,2-dithiolato)-cobalt. |
| XXXI | Tetraphenylstibonium bromide. | Mono(tetraphenylstibonium) bis(1,2-dicyanoethylene-1,2-dithiolato)-cobalt. |

| | Metal Chloride | End Product (prepared by method of Example XIV) |
|---|---|---|
| XXXII | $CrCl_2$ | Mono(methyltriphenylphosphonium) bis(1,2-dicyanoethylene-2,2-dithiolato) chromium. |
| XXXIII | $ZrCl_2$ | Mono(methyltriphenylphosphonium) bis (1,2-dicyanoethylene-1,2-dithiolato) zirconium. |
| XXIV | $MoCl_2$ | Mono(methyltriphenylphosphonium) bis-(1,2-dicyanoethylene-1,2-dithiolato) molybdenum. |
| XXXV | $(RuCl_2)x$ | Mono(methyltriphenylphosphonium) bis-(1,2-dicyanoethylene-1,2-dithiolato)-ruthenium. |
| XXXVI | $RhCl_3 \cdot xH_2O$ | Mono(methyltriphenylphosphonium) bis (1,2-dicyanoethylene-1,2-dithiolato) rhodium. |
| XXXVII | $OsCl_2$ | Mono(methyltriphenylphosphonium) bis(1,2-dicyanoethylene-1,2-dithiolato) osmium. |
| XXXVIII | $IrCl_2$ | Mono(methyltriphenylphosphonium) bis(1,2-dicyanoethylene-1,2-dithiolato) iridium. |
| XXXIX | $AuCl$ | Mono(methyltriphenylphosphonium) bis-(1,2-dicyanoethylene-1,2-dithiolato)gold. | magnetic data. For example, the oxidation of bis(tetraethylammonium) bis(1,2-dicyanoethylene-1,2-dithiolato)-nickel to mono(tetraethylammonium) bis(1,2-dicyanoethylene-1,2-dithiolato)nickel in an acetonitrile solvent with a number of oxidizing agents is vertified by a strong band at 850 m$\mu$ as observed by near infrared spectroscopy. The following table indicates the 850 m$\mu$ band formation in the above oxidation with the indicated oxidizing reagents.

| Reagent: | 850 m$\mu$ band |
|---|---|
| Stock solution (control) | None. |
| Iodine | Very strong. |
| Tetracyanoethylene | Very strong. |
| Tetracyanoquinodimethan | Very strong. |
| Chloranil | Positive. |
| Bromanil | Quite strong. |
| Dicyanodichlorobenzoquinone | Very strong. |
| Ferric chloride | Very strong. |
| Cupric nitrate | Strong. |

In aqueous solution, chlorine, bromine and acidified potassium permanganate give the monovalent anion species.

Confirmation of the production of the monovalent chelate anions is further evidenced by the following table which compares magnetic data:

COMPARATIVE MAGNETIC DATA

[$(R_4N^+)_2$ and $R_4N^+$ salts in solid state at room temperature]

$$\begin{bmatrix} NC-C-S & S-C-CN \\ \| & M & \| \\ NC-C-S & S-C-CN \end{bmatrix}^-$$

| M: | Property |
|---|---|
| Co | Paramagnetic (magnetic moment 3.92 B.M.).[1] |
| Ni | Diamagnetic.[1] |
| Pd | Diamagnetic.[1] |
| Pt | Diamagnetic.[1] |
| Cu | Paramagnetic. |

$$\begin{bmatrix} NC-C-S & S-C-CN \\ \| & M & \| \\ NC-C-S & S-C-CN \end{bmatrix}^=$$

| M: | Property |
|---|---|
| Co | Diamagnetic. |
| Ni | Weakly paramagnetic.[2] |
| Pd | Diamagnetic. |
| Pt | Weakly paramagnetic.[2] |
| Cu | Diamagnetic. |
| Fe | Weakly paramagnetic.[2] |

[1] Gray et al., J. Am. Chem. Soc., 84, 3596-7 (1962).
[2] Paramagnetism increases with increasing temperature.

Although the exact electronic formulation of the anions of Formula 2 has not been definitely ascertained, it is postulated to be one of or several of the following formulations:

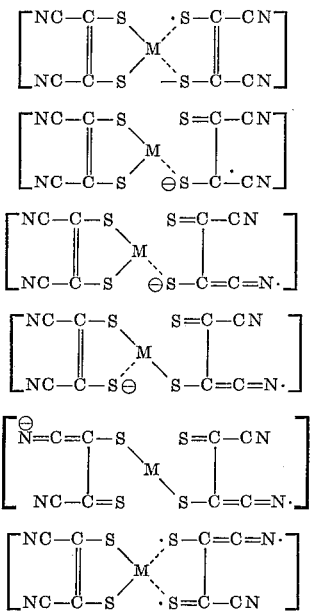

The novelty of the invention lies in the monovalent chelated anion, for the cation is provided to fulfill the valence of chelated anion and, thus, may be any cation. The ease by which one cationic component may be replaced by metathesis is demonstrated by Examples XVIII and XIX. Preferred metals which may be used as the cationic moiety, include, in addition to those listed in Example XVIII include silver, lithium, calcium, titanium, manganese, nickel and iron. Especially prefererd are those of Group I of Deming's Periodic Table.

In addition to the metals which may be used to form the cationic moiety, a wide range of cations may be used. Examples of but a few classes of cation-forming compounds which may be employed in preparing the cationic moiety include the amines and various alkyl and aryl hydrocarbon-substituted amines which may be described structurally by the following two formulas:

where $R_1$, $R_2$, $R_3$ are H, alkyl, or alkylene up to 20 carbons and when $R_1$ is aryl, $R_2$, $R_3$ are H or alkyl up to 20 carbons, and the corresponding quaternary ammonium salts as below,

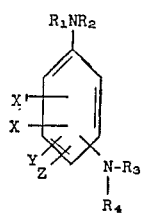

where the amino substituents are ortho or para to each other and $R_1$, $R_2$, $R_3$, $R_4$ are alkyl up to 20 carbons and X', X, Y, Z are H or hydrocarbon up to 20 carbons, which can be together joined, or other ortho- or para-directing substituents with the provisos that (1) when $R_1$, $R_2$, $R_3$, and $R_4$ are alkyl, X' and X are H, (2) when $R_1$ and $R_3$ are aryl, $R_2$ and $R_4$ are H or alkyl, and (3) where X'–X and/or Y–Z taken pairwise are cycloalkylene or fused aromatic, $R_1$ and $R_3$ are H, and the corresponding quaternary ammonium salts wherein the quaternary radical is another $R_1$, $R_2$, $R_3$, $R_4$ and any of the usual anions is involved;

The phosphines and alkyl or aryl hydrocarbon-substituted phosphines:

where $R_1$, $R_2$, and $R_3$ are alkyl or aryl up to 20 carbons (the alkyls being unsubstituted or having o- and p-directing substituents),

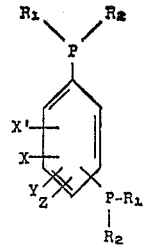

where $R_1$, $R_2$, X', X, Y, and Z are as above in the aryl amine analogs except that $R_1$ and $R_2$ cannot be H, and the corresponding quaternary phosphonium salts wherein the quaternary radical is another $R_1$, $R_2$, $R_3$ and any of the usual anions is involved;

The arsine and alkyl and aryl hydrocarbon-substituted arsines:

where $R_1$, $R_2$, and $R_3$ are as above in the phosphine analogs,

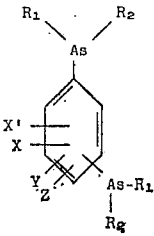

where $R_1$, $R_2$, X', X, Y, and Z are as above in the aryl phosphine analogs, and the corresponding quaternary arsonium salts wherein the quaternary radical is another $R_1$, $R_2$, $R_3$ and any of the usual anions is involved;

The stibines and alkyl and aryl hydrocarbon-substituted stibines:

where $R_1$, $R_2$, and $R_3$ are as above in the arsine analogs,

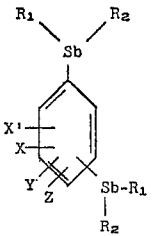

where $R_1$, $R_2$, X', X, Y, and Z are as above in the aryl arsine analogs, and the corresponding quaternary stibonium salts wherein the quaternary radical is another $R_1$, $R_2$, $R_3$ and any of the usual anions is involved; the quaternary ammonium bases or their salts, such as $R_1R_2R_3R_4N^{\oplus}$ where $R_1$, $R_2$, $R_3$, and $R_4$, are H or alkyl up to 20 carbons; metal cations; positively charged metal chelates, the atoms which coordinate with the metal being joined by a conjugated system of double bonds (aromatic or open chain); and aromatic or heterocyclic aromatic aminophenols.

Also included are the substituted amines of the alkyl and aryl hydrocarbon-substituted types defined by the foregoing two structural formulas wherein $R_1$, $R_2$, $R_3$, and/or $R_4$ are variously oxaalkylene or thiaalkylene or oxaalkyl or thiaalkyl, e.g., 4-thiapiperidine, as well as the hydroiodides of the foregoing primary, secondary, or tertiary amines, and also the corresponding quaternary ammonium iodides, e.g., morpholine hydroiodide; all heterocycles containing nuclear nitrogen and the hydroiodides or alkyl iodide salts thereof; substituted ethylenes of the type

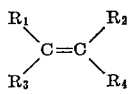

wherein from one to four of the $R_1$, $R_2$, $R_3$, or $R_4$ groups are amino or alkylamino, any remaining being alkyl, alkoxy, alkylthio, aryl, aryloxy, or arylthio; and the hydroiodide or alkyl iodide salts thereof, including the plain iodides, e.g., of the aminium type

and the Wurster iodides of aromatic amines, e.g., Wurster's blue iodide,

(In the foregoing diamines, it is expressly intended to include polynuclear diamines in which the nitrogens are connected by a conjugated system.)

Specific examples of cation precursors include: ammonia, and amines, such as ethylamine, methylamine, dibutylamine, tridecylamine, eicosylamine, and the like; diamines, such as 2,3-N,N,N′,N′-hexamethyl-p-phenylenediamine, N,N′ - dioctyl 1,5 - diaminonaphthalene, 1,4-diamino-5,6,7,8-tetrahydronaphthalene, and the like; phosphines and diphosphines, such as triphenylphosphine, tributylphosphine, ethyldioctylphosphine, 1,4-bis(diethylphosphino)benzene, and the like; ammonium and quaternary ammonium salts, such as ammonium iodide, ethyltrimethylammonium iodide, dioctylammonium iodide, methyltri-n-propylammonium iodide, and the like; metal precursors, such as the carbonyls, iodides, cyanides, e.g., iron and cobalt carbonyls, iodides, cyanides, and the like; heterocyclic aromatic amines, such as 4-aminopyridine, 3-hydroxyacridine, 3-dimethylaminocarbazole, 2-methoxyphenazine, and the like; aromatic hydrocarbon ethers, such as phenetidine, N,N-diethylanisidine, and the like; methyltriphenylarsonium, tetraoctylarsonium, tetrapentylstibonium, diethyldibutylstibonium, tridecylmethylselenonium, triphenyloctylsilenonium, and tetradodecyltelluronium.

The compounds of the invention by virtue of their low electrical volume resistivity, i.e., of about $10^5$–$10^8$ ohm-cm., are useful for their electrical conducting properties.

The compounds absorb in the near infrared, i.e., in the range of 0.5–2.0 microns, therefore, they are useful in inks and pigments for thermal reflex copying masters. Moreover, since the salts of the invention are generically colored, they find use in many of the established uses for colored materials, such as, use as the coloring material in marking instruments of the conventional pencil type wherein the fabricated single crystal serves as the equivalent of the lead. By virtue of the strong broad absorption in the near infrared region, particularly for the most desirable metal chelate salts, marks made by such marking instruments are readily and easily copied by the desirable cheap thermographic processes. In the larger single-crystal form, the metal chelate salts, because of their attractive shape and appearance being colored yet highly reflective on some of the crystal planes, find use as decorative materials, e.g., as the equivalent of gem stones in jewelry, and the like. Similarly, in the smaller single-crystal form, the salts of the invention find artistic and decorative utility, for instance, as pearlescent materials in otherwise colorless plastics, or pearlescent pigment materials for decorative lacquers and plastic solutions.

These colored solid salts find use in any of the many well-established fields, such as dyes and pigments, for both paints and plastics, and colored fillers for the latter.

The following examples illustrate the utility of the products of the invention:

EXAMPLE 1

This example illustrates the use of the products of this invention in marking instruments of the pencil type, and the use of such markings as masters for thermographic copying. Records are made by rubbing crystals of the compounds indicated below on plain white paper giving a clearly legible record of the indicated color. The record is easily copied, using a commercial thermographic copying machine and method as described in U.S. 2,740,895 –6. All the records are reproduced in good contrast.

| Compound | Product of Example | Color of Record |
|---|---|---|
| Mono(tetraethylammonium)bis(1,2-dicyanoethylene-1,2-dithiolato)nickel. | V | Black. |
| Mono(tetraethylammonium)bis(1,2-dicyanoethylene-1,2-dithiolato)copper. | VI-B | Brown. |
| Mono(tetraethylammonium)bis(1,2-dicyanoethylene-1,2-dithiolato)cobalt. | VII-B | Dark brown. |
| Mono(tetraethylammonium)bis(1,2-dicyanoethylene-1,2-dithiolato)iron. | IX | Black. |
| Mono(tetraethylammonium)bis(1,2-dicyanoethylene-1,2-dithiolato)palladium. | X-B | Dark brown. |

EXAMPLE 2

This example illustrates the use of the products of this invention in inks for preparing master records for thermographic copying. Designs are made by applying acetone solutions of the compounds indicated below to plain white paper. When the ink is dry the design are visible and clear. The designs are copied, using a commercial thermographic copying machine and method as described in U.S. 2,740,895 –6. All the designs are reproduced in good contrast.

| Compound | Product of Example | Color of Ink Design |
|---|---|---|
| Mono(tetraethylammonium)bis(1,2-dicyanoethylene-1,2-dithiolato)nickel. | V | Gray-black. |
| Mono(tetraethylammonium)bis(1,2-dicyanoethylene-1,2-dithiolato)copper. | VI-B | Brown. |
| Mono(tetraethylammonium)bis(1,2-dicyanoethylene-1,2-dithiolato)cobalt. | VII-B | Brown-black. |
| Mono(tetraethylammonium)bis(1,2-dicyanoethylene-1,2-dithiolato)iron. | IX | Do. |
| Mono(tetraethylammonium)bis(1,2-dicyanoethylene-1,2-dithiolato)palladium. | X-B | Lavender-gray. |

EXAMPLE 3

This example illustrates the preparation of ink records of the products of this invention by applying an oxidizing agent to selected areas of paper coated with a salt of a bis(1,2-dicyanoethylene-1,2-dithiolato)metal dianion and using the resulting image as a master for thermographic copying. Separate areas of white paper are coated with acetone solutions of the compounds indicated below. A record is penned on each dry coating using as ink an acetonitrile solution of tetracyanoethylene. The inked records are immediately sharply delineated by the formation of the indicated product on the paper. When the ink is dry the records are copied using a commercial thermographic copying machine and method as described in U.S. 2,740,895 –6. The printed records are clearly reproduced in good contrast and the unprinted areas of the original coating show substantially no shadow by thermographic reproduction.

| Coating Compound | Product Which Forms Record on Treatment of Coating with Tetracyanoethylene | Color of Record |
| --- | --- | --- |
| Bis(tetraethylammonium)[1] copper | Mono(tetraethylammonium)[1] copper | Dark brown. |
| Bis(tetraethylammonium)[1] palladium | Mono(tetraethylammonium)[1] palladium | Dark green. |
| Bis(tetraethylammonium)[1] nickel | Mono(tetraethylammonium)[1] nickel | Black. |
| Bis(tetraethylammonium)[1] platinum | Mono(tetraethylammonium)[1] platinum | Dark green. |

[1] Bis(1-dicyanoethylene-1,2-dithiolato).

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

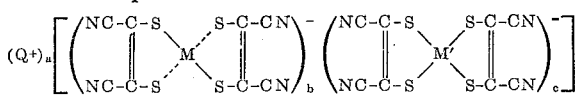

wherein Q is one equivalent of a cation selected from the class consisting of metals, ammonium, sulfonium, arsonium, phophonium, stibonium, selenonium and telluronium in which any substituents on the onium cations are selected from the class consisting of alkyl and aryl of up to 20 carbon atoms and in which the substituents on the N of the ammonium cation may form a heterocyclic aromatic ring with the nitrogen; M and M' are each selected from the class consisting of metals of atomic numbers 22–29, 40–47 and 72–79, inclusive; $a$ is defined by the formula $a=b+2c$; $b$ is a cardinal number of from 1–6, inclusive; and $c$ is a cardinal number of from 0 to 6, inclusive.

2. A compound of claim 1 wherein $c$ is zero and $b$ is a cardinal number of 1 to 2, inclusive.

3. A compound of claim 1 wherein $c$ is 1 and $b$ is 1.

4. Mono(tetraethylammonium) bis(1,2 - dicyanoethylene-1,2-dithiolato)nickel.

5. Monosodium bis (1,2 - dicyanoethylene-1,2-dithiolato)nickel.

6. Mono(tetraethylammonium) bis(1,2 - dicyanoethylene-1,2-dithiolato)copper.

7. Mono(N-methylquinolinium) bis(1,2 - dicyanoethylene-1,2-dithiolato)nickel.

8. Mono(methyltriphenylphosphonium) bis(1,2 - dicyanoethylene-1,2-dithiolato)nickel.

9. A process which comprises oxidizing a divalent bis(1,2 - dicyanoethylene - 1,2 - dithiolato)metal chelate anionic salt wherein the metal of the metal chelate is selected from the class consisting of metals of atomic numbers 22–29, 40–47, and 72–79, inclusive, at a temperature of from $-80°$ C. to $250°$ C.; with an oxidizing agent at a voltage potential of between $-0.5$ v. and $+0.5$ v. referred to an aqueous saturated calomel electrode using an acetonitrile solvent containing 0.1 M lithium perchlorate as the electrolyte and with a rotating platinum electrode.

10. The process of claim 9 carried out in a medium inert to the reactants and products at a temperature of from $-80°$ C. to $250°$ C.

11. The process of claim 9 wherein the metal chelate is bis(tetraethylammonium) bis(1,2-dicyanoethylene-1,2-dithiolato)nickel, and the oxidizing agent is tetracyanoethylene.

12. The process of claim 9 wherein the metal chelate is bis(tetraethylammonium) bis(1,2-dicyanoethylene-1,2-dithiolato)nickel, and the oxidizing agent is iodine.

References Cited by the Examiner

G. Bähr et al.: Chem. Ber., vol. 90, pp. 438–43 (1957).
Gray et al.: J. Am. Chem. Soc., vol. 84, pp. 3596–7 (1962).

NICHOLAS S. RIZZO, *Primary Examiner.*

DONALD G. DAUS, *Assistant Examiner.*